United States Patent [19]
Zalewski et al.

[11] Patent Number: 5,612,114
[45] Date of Patent: Mar. 18, 1997

[54] TEXTILE COMPOSITE, PRODUCTION THEREOF AND USE THEREOF

[75] Inventors: Edwin Zalewski; Karl-Christian Zerfass, both of Bobingen, Germany

[73] Assignee: Hoechst Aktiengesellschaft, Germany

[21] Appl. No.: 333,846

[22] Filed: Nov. 3, 1994

[30] Foreign Application Priority Data

Nov. 6, 1993 [DE] Germany ............................ 43 37 984.2
Mar. 14, 1994 [DE] Germany ............................ 44 08 492.7

[51] Int. Cl.$^6$ ..................................... B32B 3/06
[52] U.S. Cl. ...................... 428/102; 112/412; 112/432; 112/440; 428/116; 442/383; 442/388; 442/390
[58] Field of Search ................................ 428/102, 233, 428/238, 239, 285, 286, 298, 290, 302, 303, 116, 287, 257, 252, 253, 282, 284; 112/440, 438, 412

[56] References Cited

U.S. PATENT DOCUMENTS 4,472,086  9/1984  Leach .
5,160,485  11/1992  Jaillet et al. ............................ 428/116

FOREIGN PATENT DOCUMENTS 160609    11/1985  European Pat. Off. .
176847    4/1986   European Pat. Off. .
0208918   1/1987   European Pat. Off. .
403403    12/1990  European Pat. Off. .
0413295   2/1991   European Pat. Off. .
0435001   7/1991   European Pat. Off. .
1517595   7/1978   United Kingdom .
2017180   10/1979  United Kingdom .

*Primary Examiner*—James J. Bell
*Attorney, Agent, or Firm*—Connolly & Hutz

[57] ABSTRACT

Described is a composite comprising at least one textile sheet material composed of synthetic polymer fibers and at least one textile sheet material composed of inorganic fibers, which textile sheet materials are joined to one another by yarns.

The textile sheet materials are preferably joined together by sewing, knitting or stitch-bonding.

The composite is especially useful as reinforcement for the production of roofing felts.

21 Claims, No Drawings

TEXTILE COMPOSITE, PRODUCTION THEREOF AND USE THEREOF

The invention relates to a textile composite which is suitable in particular for use as reinforcement for producing roofing felts or as tarpaulin.

Textile composites for the production of roofing felts have to meet many and varied requirements. For instance, on the one hand, they must have adequate mechanical stability, such as good perforation resistance and high tensile strength, in order to withstand for example the mechanical stresses of further processing, such as bituminization or laying. On the other hand, they must be highly resistant to thermal stress, for example that involved in bituminization or to radiant heat, and also to flying brands. There has therefore been no shortage of attempts to improve existing textile composites.

It is known to combine synthetic fiber nonwovens with glass webs. Examples of such reinforcing layers are found in GB-A-1,517,595, DE-U-77-39,489, EP-A-160,609, EP-A-176,847, EP-A-403,403 and EP-A-530,769.

It is further known to produce composites by knitting or stitch-bonding techniques. Examples are found in DE-A-3,347,280, U.S. Pat. No. 4,472,086, EP-A-333,602 and EP-A-395,548. Knitted- or stitch-bonded-together combinations of textile sheet material based on synthetic fibers with textile sheet materials based on glass fibers are not described in these references.

EP-A-208,918 discloses composites for producing reinforcing layers for roofing felts, which contain a heat-stabilized and mechanically consolidated network of high tenacity polyester filament yarns. Described are composites of polyester webs and network of high tenacity polyester filament yarns which have been incorporated into the polyester web by the warp-knitting technique. A further embodiment of these prior art composites contains a glass web which has been adhesively bonded to the composite. These composites are notable for an unbroken glass web surface. However, it has been found that the glass web is somewhat prone to delaminate from the rest of the composite.

The present invention provides composites which have an improved combination of properties. This shows itself in an improved productivity in the production of these composites, in improved further processing and in improved performance characteristics. The composites of the invention are notable in particular for high resistance to flying brands and radiant heat, high perforation resistance, high tensile strength and minimal tendency to delaminate.

The present invention relates to composites comprising at least one textile sheet material composed of synthetic polymer fibers and at least one textile sheet material composed of inorganic fibers, preferably glass fibers, which textile sheet materials are joined to one another by yarns, preferably by yarns having a tenacity of at least 50 cN/tex, in particular of more than 60 cN/tex.

As used herein, the term "textile sheet material" is to be understood in its broadest sense. It comprehends any synthetic polymer or inorganic fiber structure produced by a sheet-forming technique. Examples of such structures are woven fabrics, knitted fabrics and preferably non-woven grid fabrics, synchronous course formation knits and in particular webs.

Of the synthetic polymer fiber webs, spunbonded webs are particularly preferred.

Of the webs composed of inorganic fibers and in particular of glass fibers, particular preference is given to those produced by wet-laying techniques.

The synthetic polymer fiber textile sheet materials for producing the composites of the invention customarily have basis weights of 20 to 200 g/m$^2$, preferably 40 to 100 g/m$^2$.

The inorganic fiber, especially glass fiber, textile sheet materials for producing the composites of the invention customarily have basis weights of 30 to 100 g/m$^2$, preferably of 40 to 50 g/m$^2$.

Particular preference is given to glass webs which have been consolidated with a low flammability binder, for example melamine-formaldehyde or urea resin.

To produce the textile sheet materials composed of synthetic polymer fibers, it is in general possible to use fibers composed of synthetic fiber-forming polymers or mixtures of such fibers. Examples of suitable synthetic polymers include polyamides, such as nylon or Perlon grades, aramids or preferably polyesters, in particular polyethylene terephthalate. The term "polyethylene terephthalate" is also to be understood as meaning copolymers containing repeating polyethylene terephthalate units.

To produce the textile sheet materials composed of inorganic fibers, it is possible to use for example rock wool, asbestos, carbon fibers, steel fibers, ceramic fibers and particularly preferably glass fibers or mixtures thereof.

The composites of the invention may consist of two layers or of more than two layers. Preferably these composites consist of two layers. Multilayered types preferably include, on at least one of the outer surfaces, a textile sheet material composed of inorganic fibers, in particular glass fibers.

The individual layers are bonded to one another mechanically by means of yarns.

It is possible to use any desired bonding technique, provided it permits mechanical bonding-together of the textile sheet materials using the bonding yarn. Examples of preferred bonding techniques are sewing, hitting or stitch-bonding.

A suitable bonding yarn is any yarn, preferably high tenacity yarns composed of inorganic fibers and in particular yarns composed of synthetic polymers. High tenacity yarns for the purposes of the present invention are yarns having a tenacity of at least 50 cN/tex.

The inorganic fiber materials of which the yarns may be composed include the inorganic fiber materials described above for the production of the textile sheet materials.

As well as these inorganic fiber materials, suitable fiber materials for the yarns include in particular synthetic polymers from which high tenacity fibers can be produced. Examples of such synthetic polymers include poly-a-olefins, such as polyethylene, polyether ketones, polyphenylene sulfides, polybenzimidazoles, aramids, polyamides, polyacrylonitriles (oxidized and non-oxidized types) and preferably polyesters, in particular polyethylene terephthalate.

Suitable synthetic polymers as materials for the preferred yarns include the synthetic polymers described above for the production of the textile sheet materials. The preference is again for high tenacity polyester yarns.

The bonding yarns can be staple fiber yarns or in particular filament yarns.

The filament linear density of these yarns generally ranges from 4 to 7 dtex, preferably from 5 to 6 dtex.

The yarn linear densities generally vary within the range from 80 to 2200 dtex, preferably from 1100 to 1670 dtex.

It is also possible to use mixed yarns.

The individual layers of the composite are customarily joined together by sewing or preferably by knitting or stitch-bonding.

The amount of bonding yarn to be used can vary within wide limits, depending on the bonding technique employed, on the textile sheet material used and on the mechanical property profile desired for the composite. Customarily, the bonding yarn is used in such an amount that it comes to be present in the composite at a basis weight from 4 to 150 g/m$^2$, preferably from 6 to 90 g/m$^2$.

The preferred bonding techniques include stitch-bonding, in particular the Malimo or the Maliwatt process.

The particularly preferred bonding techniques include warp-knitting, in particular rascheling, particularly preferably weft insertion rascheling. Weft insertion, or else weft lay-in, rascheling for the purposes of the present invention is a bonding technique whereby the feed, in addition to the textile sheet materials, includes warp and weft threads which are subsequently joined together with stitching threads.

The composites obtained are notable for high tensile strength, for low flammability and for minimal delamination tendencies.

Especially by stitch-bonding and warp-knitting it is possible to produce composites having particularly isotropic mechanical properties.

The composites according to the invention customarily have tensile strengths of at least 800 N/5 cm of width, preferably tensile strengths of more than 1000 N/5 cm of width.

The composites of the invention can be made into bituminous felts in a conventional manner. The specimen roofs built with these bituminous felts meet the requirements of existing European fire tests, such as DIN 4102 Part 7 (Germany), Nordtest 6 (Sweden), and T 30 (France).

The composites of the invention customarily have a delamination resistance of more than 10 N/5 cm.

The perforation resistance of the web-based composites according to the invention is surprisingly high. Values of greater than 15 kg, corresponding to class L3 of the UEAtc Basic Guidelines Section 5.1.9, are easy to achieve. Appropriate construction of the composite of the invention, for example by increasing the mass per unit area of the textile sheet material composed of synthetic polymer fibers, makes it possible to obtain values of more than 25 kg, corresponding to class L4.

The composites of the invention are notable for high flexibility.

The basis weight of the composites of the invention is customarily from 140 to 250 g/m$^2$, preferably from 160 to 200 g/m$^2$.

The bonding techniques described make it possible to produce the composites according to the invention at a high rate of production speed. The invention therefore also relates to a process for producing the composites according to the invention.

The process comprises the measures of:

a) combining at least one textile sheet material composed of synthetic polymer fibers and at least one textile sheet material composed of inorganic fibers, in particular glass fibers, to form a layered product, and b) joining the individual textile sheet materials together by sewing, hitting or stitch-bonding the layered product using yarns, preferably yarns having a tenacity of at least 50 cN/tex, in particular of more than 60 cN/tex.

The sewing-together of the individual layers of the composite can be effected using conventional apparatus, for example a quilting machine.

The stitch-bonding of the individual layers of the composite can be effected using conventional apparatus. Examples are the Malimo machine and the Maliwatt machine.

The bonding-together of the individual layers of the composite can be effected using conventional apparatus. Such apparatus is customarily a warp-knitting machine, preferably a Raschel machine. Examples are the high performance magazin weft insertion Raschel machine with web feed of the type RS 3 MSU-V from Karl Mayer Textilmaschinenfabrik GmbH, Obertshausen, or the warp-knitting machine with horizontally incoming composite material of the type COPCENTRA HV from LIBA-Maschinenfabrik GmbH, Naila.

The composites of the invention are advantageously used as reinforcing layers for the production of roofing felts or as tarpaulins.

To produce roofing felts, the composites are impregnated and/or coated in a conventional manner, for example with bitumen or with polyvinyl chloride.

However, the composites can also be used in other fields requiring high tensile strength as well as a high perforation resistance. Examples are the use as geotextiles or as tarpaulins.

The examples which follow illustrate the invention.

Example 1: A web composite was produced by intermeshing a 60 g/m$^2$ polyethylene terephthalate filament spunbonded web and a 40 g/m$^2$ wet-laid glass fiber web rendered low flammable through the addition of a binder using a polyethylene terephthalate filament yarn having a tenacity of 60 cN/tex and a linear density of 1100 dtex. The basis weight of the yarn in the composite was 90 g/m$^2$.

The composite obtained had the following properties:

Mass per unit area: 190 g/m$^2$ (determined in accordance with DIN 53 854)

Perforation resistance: greater than 25 kg (corresponding to class L4 of the UEAtc Basic Guidelines)

Dimensional stability: better than 0.5% (determined by deforming a lying specimen at 200° C. hot air; 10 min; sample size 35/35 cm; measured area 25/25 cm)

Flammability (flying brands and radiant heat): bituminized felt survives the fire test of DIN 4102 Part 7

Strength: greater than 1000 N/5 cm in warp and weft (determined in accordance with DIN 53 857 Part 2)

Example 2: A web composite was produced by intermeshing a woven polyethylene terephthalate filament fabric and a 40 g/m$^2$ wet-laid glass fiber web rendered low flammable through the addition of a binder using a polyethylene terephthalate filament yarn having a tenacity of 60 cN/tex and a linear density of 80 dtex. The woven polyethylene terephthalate filament fabric was 3 threads/cm both warpways and weftways. The threads each had a linear density of 1100 dtex and a tenacity of 72 cN/tex.

The composite obtained had the following properties:

Mass per unit area: 110–120 g/m$^2$ (determined in accordance with DIN 53 854)

Perforation resistance: greater than 15 kg (corresponding to class L3 of the UEAtc Basic Guidelines)

Dimensional stability: better than 0.5% (determined as in Example 1)

Flammability (flying brands and radiant heat): bituminized felt survives the fire test of DIN 4102 Part 7

Strength: greater than 1000 N/5 cm in warp and weft (determined as in Example 1).

Example 3: A web composite was produced by intermeshing a woven polyethylene terephthalate filament fabric and a 40 g/m$^2$ wet-laid glass fiber web rendered low flammable through the addition of a binder using a polyethylene terephthalate filament yarn having a tenacity of 60 cN/tex and a linear density of 80 dtex. The woven polyethylene terephthalate filament fabric was 9 threads/cm both warpways and weftways. The threads each had a linear density of 1100 dtex and a tenacity of 72 cN/tex.

The composite obtained had the following properties:

Mass per unit area: 250 g/m$^2$ (determined in accordance with DIN 53 854)

Perforation resistance: greater than 25 kg (corresponding to class L4 of the UEAtc Basic Guidelines)

Dimensional stability: better than 0.5% (determined as in Example 1)

Flammability (flying brands and radiant heat): bituminized felt survives the fire test of DIN 4102 Part 7

Strength: greater than 31000 N/5 cm in warp and weft (determined as in Example 1).

What is claimed is:

1. A composite comprising at least one textile sheet material composed of synthetic polymer fibers and at least one textile sheet material composed of inorganic fibers, which textile sheet materials are joined to one another by yarns composed of synthetic polymer fibers, and the composite having a tensile strength of at least 800 N/5 cm.

2. The composite of claim 1, wherein the inorganic fibers are glass fibers.

3. The composite of claim 1, wherein the yarns are yarns having a tenacity of at least 50 cN/tex.

4. The composite of claim 3, wherein the yarns are yarns having a tenacity of at least 60 cN/tex.

5. The composite of claim 1, wherein the textile sheet material composed of synthetic polymer fibes is a non-woven grid, a synchronous course formation knit or a web.

6. The composite of claim 5, wherein the textile sheet material composed of synthetic polymer fibers is a spun-bonded web.

7. The composite of claim 1, wherein the textile sheet material composed of synthetic polymer fibers comprises polyester fibers.

8. The composite material of claim 7, wherein the polyester fibers are polyethylene terephthalate fibers.

9. The composite of claim 1, wherein the textile sheet material composed of synthetic polymer fibers has a basis weight of 20 to 200 g/m$^2$.

10. The composite of claim 1, wherein the textile sheet material composed of inorganic fibers is a web.

11. The composite of claim 10, wherein the web is a wet-laid glass fiber web.

12. The composite of claim 1, wherein the textile sheet material composed of inorganic fibers has a basis weight of 30 to 100 g/m$^2$.

13. The composite of claim 1, wherein the yarns composed of synthetic polymer fibers consist of polyester.

14. The composite of claim 13, wherein the polyester is polyethylene therephthalate.

15. The composite of claim 13, wherein the polyester yarns are present in the composite in an amount of 4 to 150 g/m$^2$.

16. The composite of claim 1, having a tensile strength of more than 1000 N/5 cm.

17. The composite of claim 1, wherein the textile sheet materials are joined together by rascheling or stitch-bonding.

18. The composite of claim 17, wherein rascheling is weft insertion rascheling.

19. The composite of claim 1, wherein the textile sheet material composed of synthetic polymer fibers is a polyester fiber web and the textile sheet material composed of inorganic fibers is a glass web and these textile sheet materials are joined together by rascheling, stitch-bonding or sewing.

20. The composite of claim 1, wherein the textile sheet material composed of synthetic polymer fibers is a woven or non-woven grid of polyester fibers and the textile sheet material composed of inorganic fibers is a glass web and these textile sheet materials are joined together by rascheling, stitch-bonding or sewing.

21. The composite of claim 1, wherein the composite has a delamination resistance of more than 10 N/5 cm.

* * * * *